April 2, 1963  E. FABER  3,083,460
METHOD AND APPARATUS FOR MAKING NON-GAPING DENTURES
Filed Sept. 23, 1958  8 Sheets-Sheet 1

Inventor:
Erich Faber

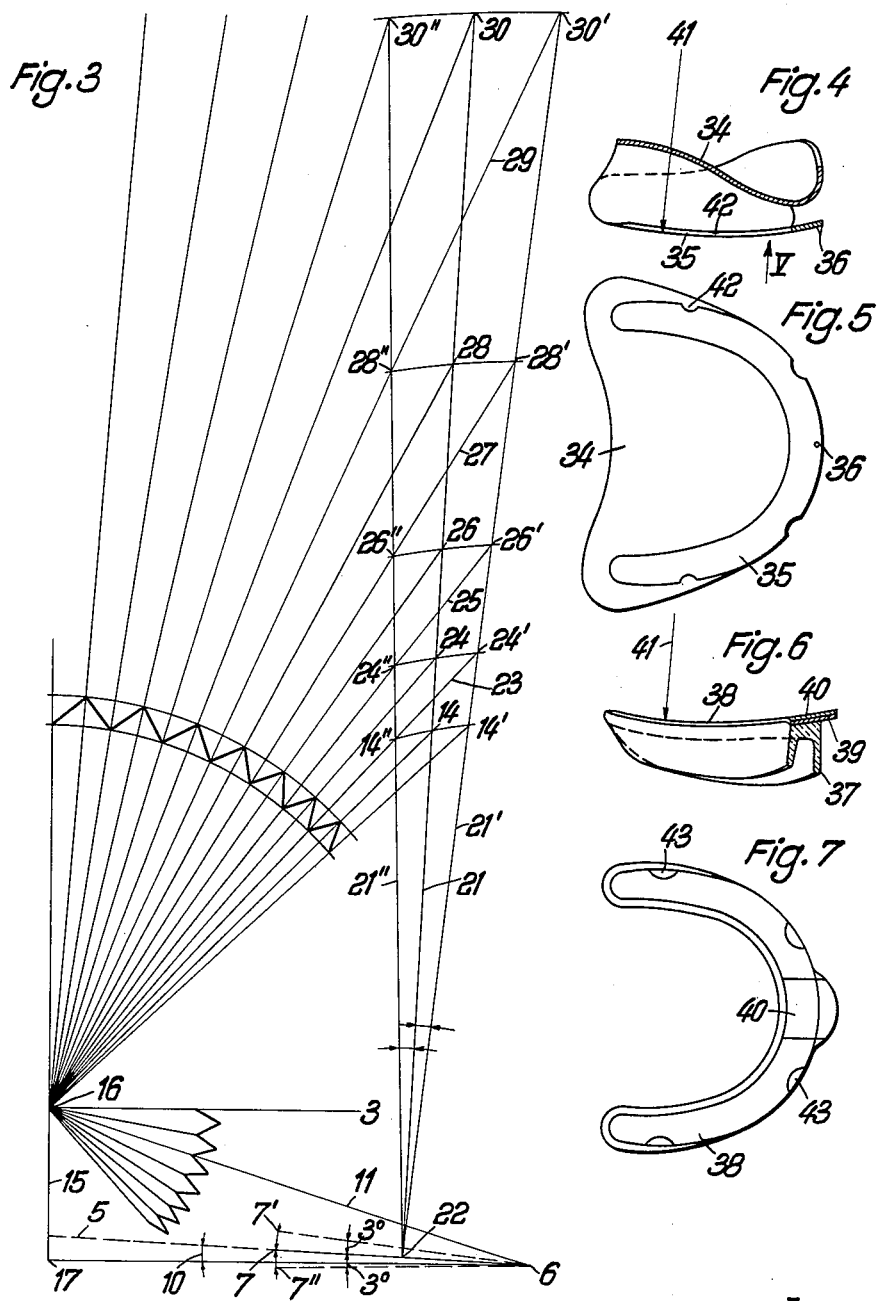

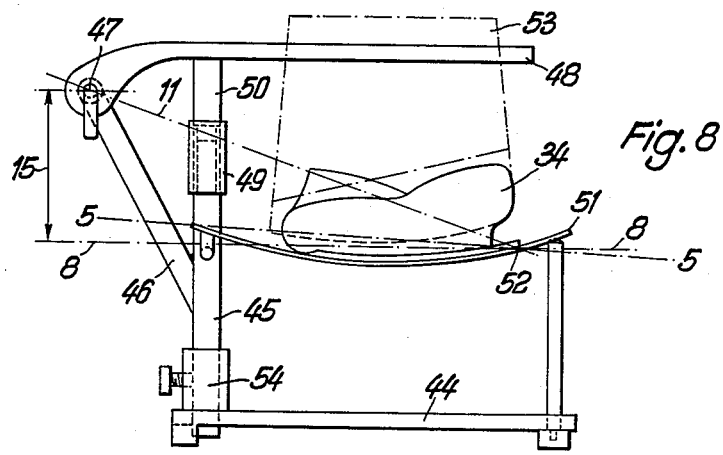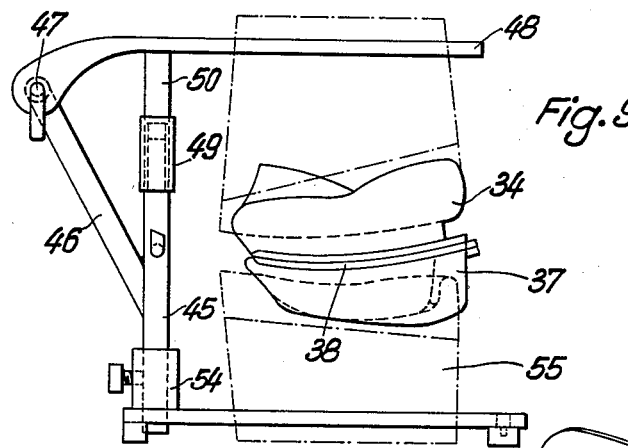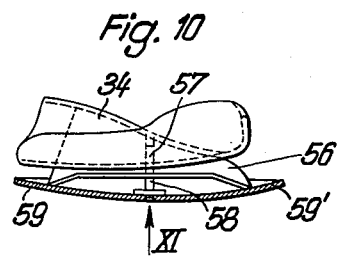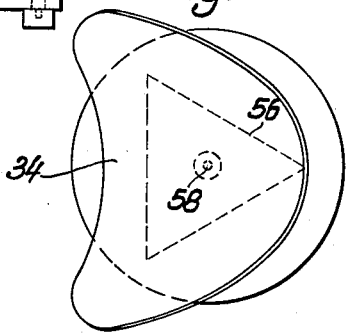

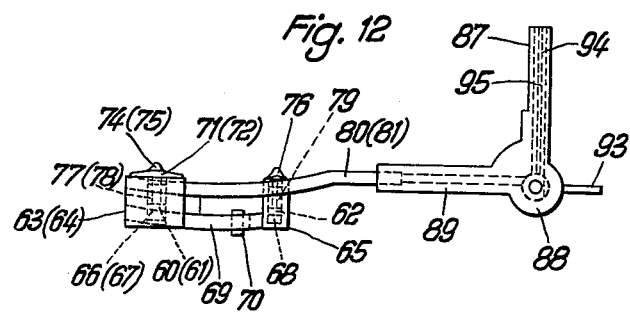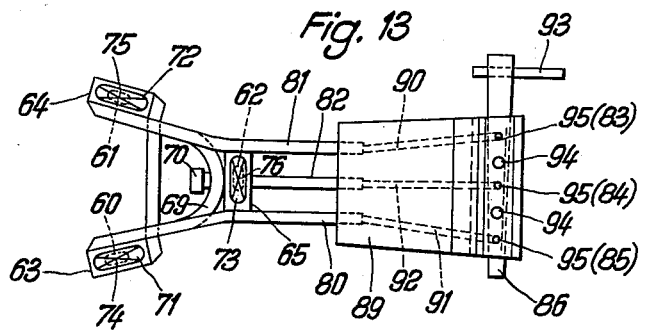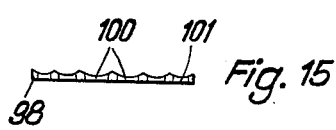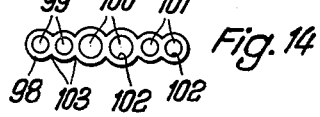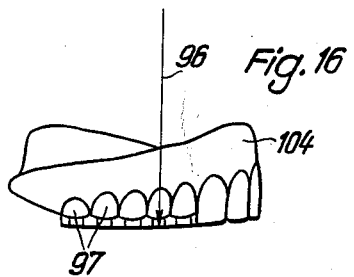

April 2, 1963 E. FABER 3,083,460
METHOD AND APPARATUS FOR MAKING NON-GAPING DENTURES
Filed Sept. 23, 1958 8 Sheets-Sheet 5

Inventor:
Erik Faber

April 2, 1963            E. FABER            3,083,460
METHOD AND APPARATUS FOR MAKING NON-GAPING DENTURES
Filed Sept. 23, 1958            8 Sheets-Sheet 6

Inventor:

Erik Faber

April 2, 1963 E. FABER 3,083,460
METHOD AND APPARATUS FOR MAKING NON-GAPING DENTURES
Filed Sept. 23, 1958 8 Sheets-Sheet 7

Inventor:
Erik Faber

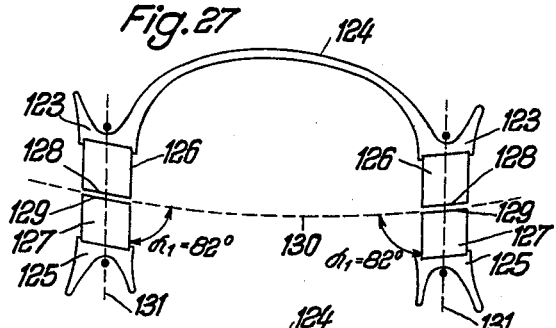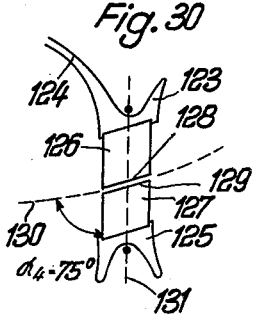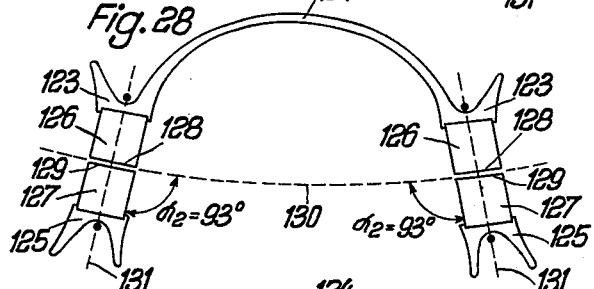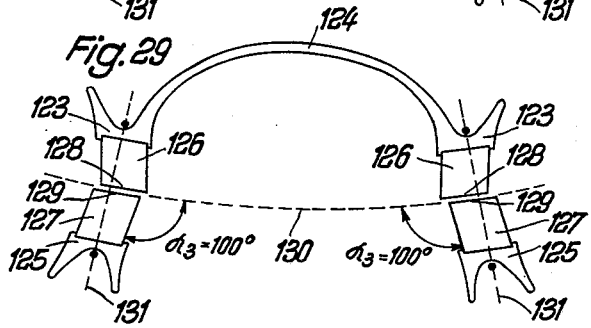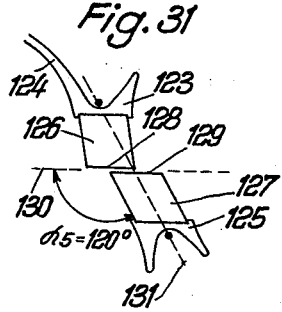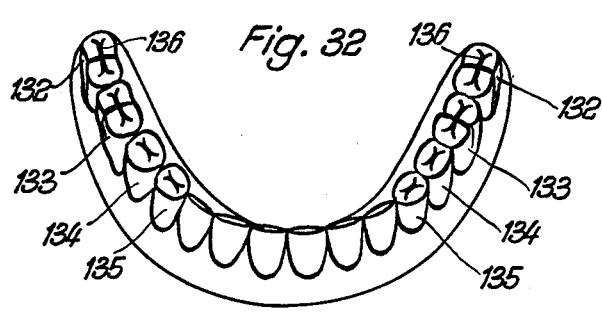

United States Patent Office 3,083,460
Patented Apr. 2, 1963

3,083,460
METHOD AND APPARATUS FOR MAKING NON-GAPING DENTURES
Erich Faber, Morbach, Hunsruck, Germany
Filed Sept. 23, 1958, Ser. No. 762,761
Claims priority, application Germany Sept. 30, 1957
12 Claims. (Cl. 32—2)

In dentistry it is always necessary to take the mandibular joint into consideration in order to provide a balanced articulation. A balanced articulation exists when all teeth remain in contact during forward and lateral movements of the lower jaw. If the articulation of the jaws is not taken into consideration, the rows of teeth will gape either in the cheek or incisor region during a forward or lateral movement of the lower jaw. This is referred to as Christensen's phenomenon.

A number of attempts have been made to provide a balanced articulation. For instance, joint measurements have been made with devices developed mainly by Gysi and Hanau and the angular values found have been reproduced by adjustable joint path articulators.

These processes have not found general application in practice. In the first place, comprehensive special knowledge is required for evaluating the joint path angles found. The devices are complicated in construction, and delicate and their success is not in proportion with the structural and time expenditures. This is due to the summation of the numerous small errors which occur from the beginning of the measurement to the making of the finished denture, which is in most cases a total one, so that in spite of all care the dentures must be subsequently reoccluded and ground in the articulator. This causes a greater or smaller flattening of the humps so that the measurement of the joint path angles is practically insignificant.

As contrasted therewith the present invention is based on the recognition that a surface curved in two directions can be associated with each joint path angle as a chewing surface so that the movement of the lower jaw cannot cause the occurrence of Christensen's phenomenon. In a first approximation this surface curved in two directions may be considered equivalent to a spherical segment, which may have different diameters in dependence on the individual joint path angles. It is another recognition underlying this invention that these diameters can also be divided into steps—this has been confirmed by an extremely large number of measurements—so that a restricted structural expenditure regarding equipment and components is sufficient to make dentures in which Christensen's phenomenon does not occur.

Based on these recognitions, which will be illustrated and clarified by drawings, a method of making non-gaping dentures with the aid of an impression-taking device is characterized according to the invention in that the bite walls are covered with horseshoe-shaped metal templates, which in their surface configuration belong to surfaces curved in two directions with mean radii of curvature, the height of the bite and the symphysis path are determined, the templates are relatively fixed in the rear position of the lower jaw and are applied and affixed in an articulator to an orientating spherical segment having radii of curvature which agrees with those of the metal template of the bite walls, in consideration of the three-dimensional relation to the mandibular joint, whereafter the bite wall of the upper jaw with a holder for holding replaceable measuring spherical segments thereto, and a lower jaw template with the measuring instrument affixed thereto are introduced into the mouth and the distances of the boundary surface of the measuring spherical segment facing the lower jaw are measured in relation to each other at least at three points of the lower jaw, suitably corresponding to the incisor point and two molar points, during positions assumed by the lower jaw after forward and lateral movements thereof; if the measuring spherical segment shows different distances indicating Christensen's phenomenon it is then replaced by measuring spherical segments having different radii of curvature until Christensen's phenomenon is no longer present; thereafter the denture is made in the articulator in a manner known per se by mounting the teeth on a working spherical segment having radii of curvature which agree with those of the measuring spherical segment which does not exhibit Christensen's phenomenon, and is preferably provided with pre-formed ring ledges as chewing faces. Where metal chewing rails are undesired or cannot be provided for economic reasons, prefabricated humpless teeth may be used, the chewing surfaces of which have according to the invention predetermined positions relative to the tooth axes. In accordance with the above-mentioned possibility of using a spherical segment as a higher order curved surface with satisfactory results, the curved surfaces of the impression-taking templates, orienting, measuring, working and, if desired, grinding spherical segments are generally replaced by a spherical surface so that the specifications of the various radii of curvature may be replaced by a determination of the radius of the sphere.

The metal templates may be provided with a compensating system, which may be of hydraulical type, to compensate any errors which might occur in taking the impression due to the resiliency of the mucous membrane.

The devices which serve to carry out the method will be discussed in connection with the drawings, which explain first the theoretical principles underlying the method defined and then the means with the aid of which the method can be carried out in a simple, practical manner.

In the drawing,

FIG. 3 shows the graphic method of determining the appropriate sphere radii.

FIG. 4 is a central vertical sectional view of the bite wall of the upper jaw with the metal template applied thereto.

FIG. 5 is a top plan view taken in the direction of the arrow 5 in FIG. 4.

FIG. 6 is a central vertical sectional view of the bite wall of the lower jaw, also with the metal template applied thereto.

FIG. 7 is a top plan view taken on the structure of FIG. 6.

FIG. 8 shows the bite template of the upper jaw in the articulator as applied to an orienting spherical segment.

FIG. 9 shows the same articulator with the lower jaw wall introduced into the same.

FIG. 10 shows the bite wall of the upper jaw with a measuring spherical segment introduced into it.

FIG. 11 is a top plan view taken in the direction opposite to the direction of the arrow 11 in FIG. 10.

FIG. 12 shows the device for measuring the distances of three points of the lower jaw from the measuring spherical segment in relation to each other after introduction into the mouth during movements of the lower jaw.

FIG. 13 is a top plan view of the device shown in FIG. 12.

FIG. 14 is a ring ledge, which can be prefabricated and which is suitable for closing a row of teeth toward the opposite row of teeth.

FIG. 15 is a side view of the ring ledge shown in FIG. 14.

FIG. 16 is a side view of a finished denture for an upper jaw, in which the cheek teeth are prefabricated from a block of teeth to match the ring ledge of FIG. 15, which is also sold as a prefabricated article.

Figure 20:
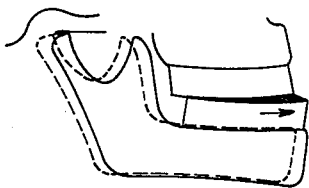

FIG. 20 illustrates with reference to a jaw model how the occurrence of Christensen's phenomenon may be used to recognize whether the selected radii of curvature of the spherical segments are too large or too small. During the forward movement of the lower jaw to the right when viewed as in FIG. 20 the occurrence of Christensen's phenomenon indicates that the initially selected radius of curvature of the spherical segment was too small to cause Christensen's phenomenon to disappear so that a larger radius of curvature is to be selected for the spherical segment.

Figure 21:
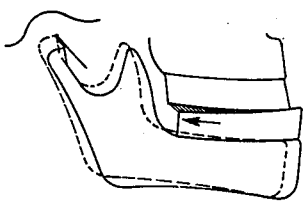

FIG. 21 indicates the reverse situation, in which the radius of curvature of the spherical segment was too large and a smaller spherical segment had to be used to eliminate Christensen's phenomenon.

Figure 22:
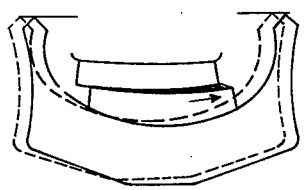

FIG. 22 shows the same for the lateral movement of lower jaw to the right. The radius of curvature of the spherical segment is again too large to eliminate Christensen's phenomenon. For this reason a spherical segment having a smaller radius of curvature is required.

Figure 23:
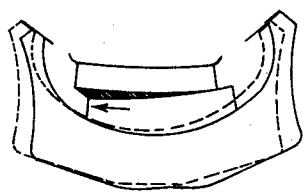

FIG. 23 shows the reverse situation. The originally selected spherical segment had an excessive radius of curvature and a spherical segment having a smaller radius of curvature is required to eliminate Christensen's phenomenon.

Figure 24:
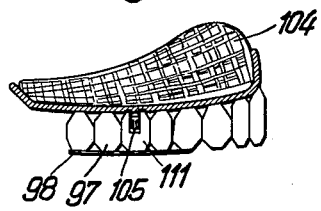

FIG. 24 shows the arrangement of a hydraulic compensating system in a finished prosthesis.

Figure 25:
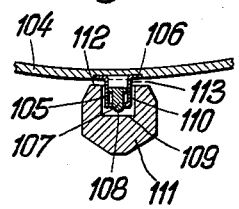

FIG. 25 is an enlarged view of a detail of FIG. 24.

Figure 26:
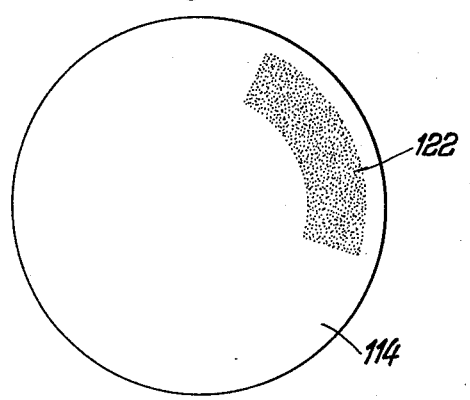

FIG. 26 is a top plan view of the working spherical segment, which is constructed to provide a grinding spherical segment at the same time.

FIG. 27 is a diagrammatic vertical sectional view showing the region of the prefabricated cheek teeth of nongaping lower and upper dentures in aligned biting position, in which the chewing faces of the cheek teeth conform to a spherical segment which depends on the joint path angle and has a radii of curvature of 180 mm., and in which the interalveolar line includes an angle of 0° with the median perpendicular of the arrangement shown.

FIG. 28 shows also a vertical sectional view corresponding to FIG. 27, which differs from the denture of FIG. 27 in that the interalveolar line is inclined by 13° from the median perpendicular of the arrangement shown.

FIG. 29 corresponds to the showing of FIG. 28 with the difference from FIG. 28 that the position of the teeth differs from the aligned biting position.

FIG. 30 is a fragmentary sectional view of a denture which is provided with prefabricated teeth and in which the chewing faces of the teeth, which are in aligned biting position, are in accordance with a spherical segment having a radius of curvature of 90 mm. and in which the inclination of the interalveolar line is zero degrees in accordance with FIG. 27.

FIG. 31 is a fragmentary sectional view of a denture in which the chewing faces of the teeth are in accordance with a spherical segment having an infinite radius of curvature whereas the inclination of the interalveolar line is 30° and the teeth are shown in an arrangement which differs more from the aligned biting position.

FIG. 32 is a perspective view illustrating by way of example the construction of a lower denture with cheek teeth formed according to the invention without humps.

Figure 1:
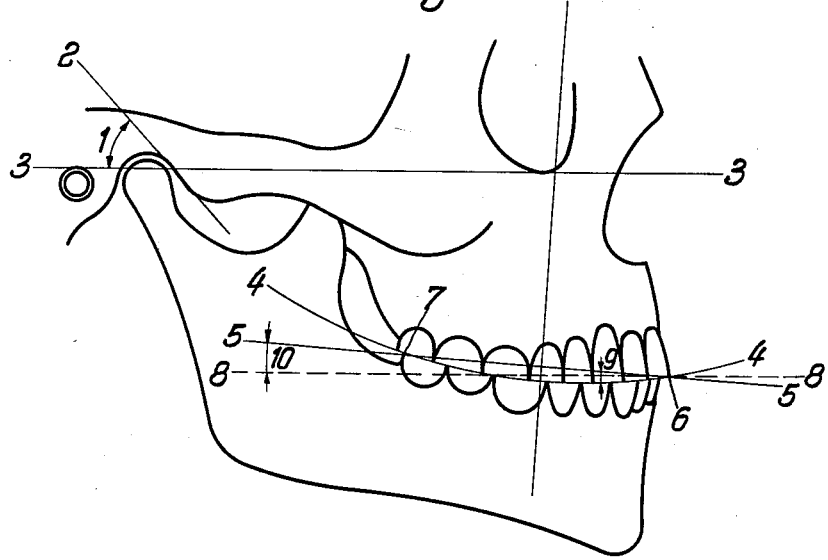
FIG. 1 is a lateral view of the upper and lower jaws of a human being, with emphasis on the geometry of the articulation thereof.

In FIG. 1, 1 is the joint path angle whereas the joint path is indicated by line 2. 3 is the so-called Frankfurt horizontal. 4 is the occlusion surface, which is an arc of a circle where a spherical segment is employed. In accordance therewith 5 is the occlusion chord, which includes the incisor point 6 and the rear molar point 7. The incisor point is substantially fixed for cosmetic reasons. It lies generally two millimeters below the upper boundary of the red of the lip. The molar point coincides with the point bisecting a side length of Bonwill's triangle. This means that its distance from the incisor point is generally fifty millimeters. If the dependence of the occlusion surface from the joint path angle is not taken into consideration, forward and lateral movements of the lower jaw will cause a unilateral load on the jaw ridges. This results in permanent damage to the bearing of the denture, e.g., in the formation of a shaking ridge, or implanted artificial teeth are rocked to and from or lifted from their support as a result of the continuously changing load on the tissue so that they must ultimately be completely removed. 8 is a parallel through the incisor point to the Frankfurt horizontal. Innumerable examinations have shown the mean distance of lines 3 and 8 to be about thirty millimeters. The present discussion is based on this mean value. If this mean value is changed by different anatomic conditions, this will have to be taken into consideration. The angle 9 between line 8 and the tangent from point 6 to the occlusion surface 4 is also called the inclination of the incisor path. The distance from the apex of the occlusion curve 4 from the line 8 is the depth of the occlusion curve and 10 is the inclination of the occlusion chord.

Figure 2:
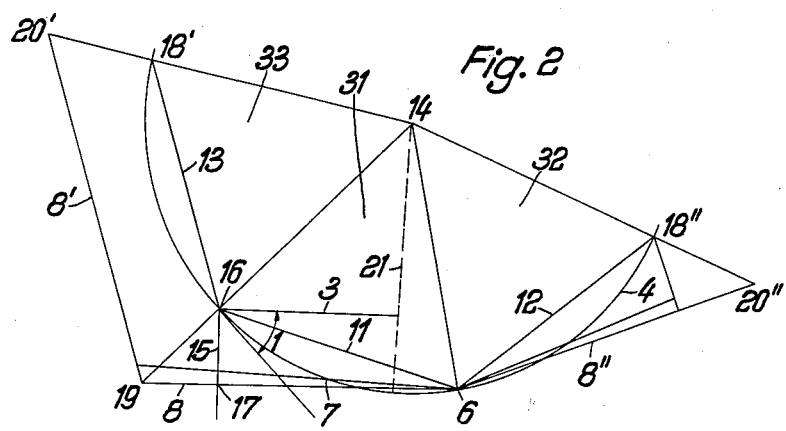
FIG. 2 shows a development of a three-side pyramid, the apex of which forms the centre of a spherical segment selected by way of example and the base of which corresponds to Bonwill's triangle and will be defined more in detail hereinafter.

In FIG. 2, which is not true to scale, the incisor point is again shown at 6. 11 and 12 are the left-hand and right-hand sides, respectively, of Bonwill's triangle, the dorsal side of which is indicated at 13. The lengths of the sides are 100 mm. to correspond to Bonwill's mean measurements of the human skull. The Frankfurt horizontal is again indicated at 3. In the simplified assumption of a spherical segment the occlusion surface occurs as an arc of a circle 4, on which lie the points 16, 18' and 18", which will be mentioned hereinafter, in addition to point 6, so that the center 14 of this arc, forming at the same time the apex of the pyramid when the same is three-dimensionally erected, is also the center of curvature of the occlusion surface. As a result the joint path angle is indicated at 1. If the development was drawn true to scale, as FIG. 1, the distance 15 between points 16 and 17 would be thirty millimeters. When the pyramid is closed the two points 18' and 18" come together in one point. 19 is the intersection of the lines which connect the points 14 and 16 and 6 and 17. When the pyramid is closed the point 20' coincides again with the point 20". If the point 7 corresponds to the molar point in FIG. 1 the center of curvature 14 must lie on this median perpendicular to prevent the occurrence of Christensen's phenomenon at 6 and 7. Lines 8, 8' and 8" define the base of the pyramid; this base defines a plane which is parallel to the Frankfurt horizontal plane.

The relations are shown true to scale in FIG. 3. There the point 16 is shown on the Frankfurt horizontal 3. The distance 15 between points 16 and 17 is again thirty millimeters. The occlusion chord 5 passes through the incisor point 6 to include the angle 10 with the line which connects the points 6 and 17. The distance 11 between points 6 and 16 is one hundred millimeters to correspond to the side of Bonwill's triangle. 7 on line 5 is again the last molar point, the distance of which from point 6 is selected to be fifty millimeters, corresponding to half a side length of Bonwill's triangle. In this case the median perpendicular 21 on the line which connects the points 6 and 7 is the geometrical locus of the centers of all arcs of circles including the points 6 and 7. This median perpendicular 21 contains again the point 14 as the radius of curvature of the spherical segment which includes also the point 16 of Bonwill's triangle, namely, the mandibular joint. In accordance therewith the distance between points 14 and 16 and points 14 and 6 is 106 millimeters. The area between the upper and lower jaws, not shown, enables the occlusion chord 5 to be swung about the incisor point 6 generally by as much as 4° upwardly and 4° downwardly. For this reason the consideration must be based on the fact that point 7 may be moved upwardly to 7' and downwardly to 7''. When the median perpendiculars 21' and 21'' are again drawn on the lines 6, 7' and 6, 7'', the lines 14' and 14'' lying on these perpendiculars will have equal distances from points 6 and 7' and from 6 and 7'', respectively. For this reason a spherical segment having a radius of 106 mm., being the distance between points 14 and 6, corresponding to the distance between points 14 and 16 will be suitable to cover all joint path angles which lie between the perpendiculars on the lines 14', 16 and 14'', 16 at the point 16. To obtain the necessary connection to the range thus defined it is sufficient to connect points 14'' and 16 by the radius vector 23 to obtain the point 24' and further the points 24 and 24''. A spherical segment having a radius of curvature equal to the distance between points 6 and 24 will then cover the next adjacent range of the joint path without steplike transitions. The same applies to the radius vector 25, the intersection of which with line 21' provides the point 26' and further the points 26 and 26''. The radius vector 27, which connects the points 26'' and 16, provides the point 28' and further the points 28 and 28''. This is repeated with the radius vector 29 providing points 30', 30 and 30'' until the last perpendicular on the radius vectors coincides with the Frankfurt horizontal 3. This results in seven spherical segments having radii of curvature of 106 mm., 120 mm., 140 mm., 180 mm., 245 mm., 430 mm., and 2100 mm. Practical experience has confirmed that these seven spherical segments are sufficient to compensate all occurring joint path angles so that Christensen's phenomenon will not occur when the lower jaw is displaced relative to the upper jaw. In FIG. 3 the relations have been considered which occur in the pyramid face 31 on the left of the incisor point 6. It will be appreciated that the same considerations as for the left-hand face 31 apply to the pyramid face 32 adjoining on the right. The dorsal pyramid face is indicated at 33 only for the sake completeness. Thus, FIG. 3 does not only apply to the above consideration of the surface 31 but also to the three-dimensional consideration as far as this has not ben anticipated by reference to the spherical surfaces. It is understood that there are extremely asymmetrical forms of jaws. In such case the following remarks remain applicable but must be considered as referring only to one half of the jaws in each case. In such cases the subsequently described measuring and working spherical segments will have to be of split or adjustable construction for adaptation to unequal joint path angles.

The practical utilization of these relations is shown in FIGURES 4 to 31. FIGS. 4 and 5 show a bite wall which is formed in accordance with an upper jaw model and the palate portion of which appears at 34 in the central sectional view. The bite wall is covered with the horseshoe-shaped metal template 35. At the point which corresponds to the incisor point 6 this template has a writing point 36, which may consist of a simple conical projection. The bite wall formed on the lower jaw model is apparent in FIGS. 6 and 7. The bite wall 37 is again covered with a metal template 38. The metal template 38 is recessed at 39, where it has means for recording the symphysis path, which means consist of a recording wax layer 40, in which the traces of the writing point 36 are recorded. In this way the symphysis path can be recorded in a manner similar to that of Gysi's measuring arc but intraorally, in a clear arrangement and without interference with the movements of the tongue and jaws. The metal templates 35 and 38 could be of any desired shape. Because the occlusion surface is mainly a spherical segment, however, it is suitable to give the metal templates 35, 38 in accordance with a spherical segment the radius of which corresponds to a mean value of about 180 mm. This radius of curvature is indicated in FIGS. 4 and 6 at 41. As is apparent from FIGS. 4 to 7, the horseshoe-shaped metal templates 35, 38 have recesses 42, 43, into which the material forming the bite walls 34 and 37 can be forced since this material is in most cases thermoplastic, such as wax. Hence, the two templates can be fixed simply by forcing the impression taking wax of the lower template against the upper one, without any further auxiliary means.

Figure 17:
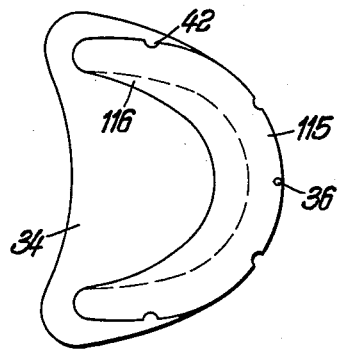
FIG. 17 is an upper bite template, the width of which is increased to provide an adequate abutment surface for tactile feelers which provide a hydraulic compensation for the resilience of the mucous membrane and are shown in FIGS. 18 and 19.
Figure 18:
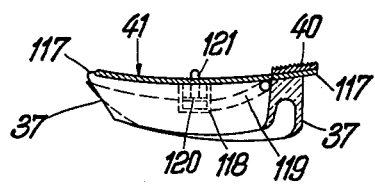
FIG. 18 is a central vertical sectional view of the bite wall for the lower jaw with a metal template applied thereto, which is provided with the abovementioned hydraulic tactile feelers for compensating the resilience of the mucous membrane.
Figure 19:
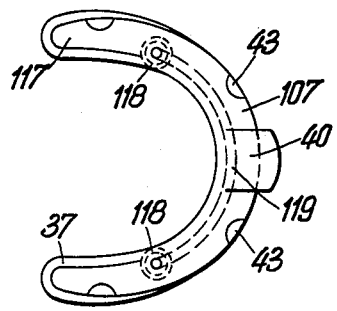
FIG. 19 is a top plan view on the structure of FIG. 18.

FIGS. 17 to 19 show a slightly different formation of the bite template, which is provided to eliminate one operation in the making of the denture in the laboratory and in the fitting of the denture to the patient and further to provide a rough determination of the curvature of the spherical segment because Christensen's phenomenon becomes already apparent according to FIGS. 21–24 during movements of the template. The bite template 115 of the upper jaw in FIG. 17 corresponds to the bite template 35 of the upper jaw of FIG. 5 with the difference that its surface is enlarged in accordance with the boundary edge 116 to provide an adequate abutment for the tactile feelers to be described with reference to FIGS. 18 and 19.

FIG. 18 is a central sectional view of the bite template of the lower jaw, shown in plan in FIG. 19, and has contrary to the bite template 38 of FIGS. 6 and 7 a hydraulic compensating system. To this end the bite template 117 of the lower jaw has two opposed cylinders 118 applied thereto, which are interconnected by an arcuate conduit 119. Pistons 120 movable in the cylinders 118 terminate in tactile points 121. The conduit 119 and the adjoining cavities in the cylinders 118 extending as far as to the end faces of the pistons 120 are filled with oil, glycerine or liquid plastics. Seals, not shown, which are provided in the pistons 120, prevent a leakage of the liquid. Thus, the lower jaw template 117 is provided with a hydraulic compensating system, which precludes sources of error caused by the resiliency of the mucous membrane and at the same time indicates gaping.

FIGS. 8 and 9 show the articulator which is used to ascertain the individual relations obtained by taking the impression. The articulator is constructed in an inherently usual manner by comprising a support 44 holding the carrying rod 45. The carrying rod 45 has an angle 46, which forms at 47 a joint for the upper part 48 of the articulator. To determine the height of the bite the screw-threaded sleeve 49 on the rod 45 is provided. The stop 50 of the upper part thereof locates the same in a certain position relative to the lower part 44 of the occludor. Different from the previous construction of the articulator is the provision of an orienting spherical segment 51, whose radius of curvature, not shown, agrees with the radius of curvature 41 of the metal templates of FIGS. 4 and 6. The spherical segment fixes the point 52, which corresponds to the incisor point 6, the orienting spherical segment being, e.g., punch-marked at this point. The upper jaw model with the metal template 35 is applied to the orienting spherical segment 51 in such a manner that the point 36 of the symphysis path recorder falls into the punch mark 52. In this case the imaginary line 5 shown in the drawing will correspond to the occlusion chord 5 of FIGS. 1 and 8 and will be the parallel to the Frankfurt horizontal of FIG. 1. The distance 15 of this parallel to the joint 47, amounting to 30 mm., corresponds to the distance 15 in FIGS. 2 and 3. The upper jaw model is affixed in the articulator in the usual manner by means of a prolonged model base to enable the operations at the articulator to be performed independently of the denture bearer. The rod 45 of the articulator is vertically adjustable by the means 54 to enable consideration to be given to the thickness of the mucous membrane in the case of implanting work.

FIG. 9 shows the bite wall 37 of the lower jaw with the metal template 38 applied to the metal template 35 of the bite wall 34 of the upper jaw according to the fixation in the recesses 43, 42 of the two metal templates. The lower jaw model is removably affixed in the lower part of the articulator, also by a prolongation of its plaster base. Then the metal template 35 is removed from the bite wall 34 of the upper jaw and is replaced by the holder 56. This holder 56 has a central recess 57 for receiving the spring pin 58, which carries one of the seven measuring spherical segments 59, which are suitably provided in accordance with what has been said hereinbefore with reference to FIGS. 1 to 3 and the radii of curvature of which have the above-mentioned values of 106 mm., 120 mm., 140 mm., 180 mm., 245 mm., 430 mm., and 2100 mm. The pin 58 is made resilient suitably by having a longitudinal slot so that it is safely retained in the baseplate 56. First the measuring spherical segment having a radius of 180 mm. is fitted and with the aid of the appropriate orienting spherical segment 51 is brought in the articulator to the correct height of bite determined by taking the impression. The measuring spherical segment 59 is suitably circular in plane but might also conform to the impression 34. The boundary surface 59' facing the lower jaw is suitably continuous to avoid an interference with movements of the measuring instrument which will be described hereinafter. This measuring instrument is shown in FIGS. 12 and 13. It consists of cylinders 63, 64, and 65, which contain three movable pistons 60, 61, and 62. The cylinder spaces 66, 67, and 68 below the pistons 60—62 communicate with each other through the pipe 69. The screw connection 70 enables this pipe to be exposed, re-filled, emptied and, if desired, vented. The pistons 60, 61, and 62 carry heads 71, 72, and 73, the upwardly facing ends of which are suitably formed as tactile feelers so that the heads can be caused to engage opposite surfaces practically at points 74, 75, and 76. The cylinder spaces 77, 78, and 79 between the piston 60, 61, and 62 and the heads 71, 72, and 73 are individually connected through the pipes 80, 81, and 82 and an interposed valve body and plug to be mentioned hereinafter to capillaries, which are disposed above the bores 83, 84 and 85 of the plug 86 in a platelike extension 87 of the valve body 88. This valve body has another platelike extension 89, which extends substantially horizontally whereas the platelike extension 87 is vertical. Through bores 90, 91, and 92 in the extension 89 the pipes 80, 81, and 82 from the cylinder spaces 77, 78, and 79 are connected to the plug bores 83—85 and the overlying capillaries. The parts 87, 88, 89 consist preferably of transparent synthetic resin. The plug 86 is rotatable by means of the handle 93 to a second position, in which the connection between the plug bores 83—85 and the longitudinal bores 90—92 is interrupted. A third plug position connects the bores 90—92, on the one hand, and the capillaries, on the other hand, to venting bores 94 in the extension 87. These venting bores are much larger in diameter than the capillaries 95 of the extension 87. For this purpose the plug has, e.g., a longitudinal slot, which connects said cavities to each other. This enables the suitably colored liquid partly filling the cylinder spaces 77—79, the bores 90—92, and the capillaries 95 to be well visible. The liquid which connects the cylinder spaces 66—68 through the pipe 69 need not be colored because it serves only for transmitting pressure. The entire device which is shown in FIGS. 12 and 13 and has been described hereinbefore is fixed by means of the cylinder housings 63—65 to a lower jaw template in such a manner that the same can be introduced together with the device according to FIGS. 12 and 13 into the mouth of the patient. Previously the device according to FIGS. 10 and 11 had been applied to the upper jaw of the patient, using the measuring spherical segment 59 which is presumably suitable. The patient then closes his mouth and performs forward and rearward and lateral movements with the lower jaw. The feeler points 74, 75, and 76 of the device according to FIGS. 12 and 13 are thus caused to engage the measuring spherical segment. If this still exhibits Christensen's phenomenon, the feeler will rise at the point where gaping occurs whereas the pistons of the feelers at other points will be correspondingly lowered owing to the provision of the connecting conduit 69. In the cylinder in which the piston rises the volume of the cylinder space above the piston is reduced, whereby measuring liquid is forced through one of the conduits 80—82 and one of bores 90—92 and 83—85 upwardly into the associated capillary 95. This gives an exact indication of the gaping effect. The measuring spherical segment 59 is now replaced by one which does not cause the measuring liquid to rise in the capillary at any point. Thus the spherical segment is found which ensures that the chewing surface of the denture will be spaced so as to preclude Christensen's phenomenon. Humpless teeth are mounted on this measuring spherical segment or an appropriately larger working spherical segment in the articulator and are combined to form a denture.

The working spherical segment in the articulator is shown at 114 in plan in FIG. 26. It may also be used for grinding the roof. For this purpose boundary surfaces on one or both sides of the working spherical segment 114 are provided entirely or partly with abrasives 122, such as diamond dust. The roof can then be ground with the spherical segment.

FIG. 16 shows such a finished upper total denture, the occlusion surface of which has the radius of curvature 96 determined by the method described hereinbefore so that Christensen's phenomenon will not occur during movements of the lower jaw because the denture under vertical load is uniformly forced against the denture bearing in all positions of the lower jaw. Owing to the low frictional resistance the forces tending to cause a horizontal displacement are reduced to the utmost minimum. The humpless artificial teeth 97 are closed by sharp-edged metal ring members 98, which are shown in side elevation in FIGS. 14 and 15. The recesses enclosed by the ring members have suitably two different sizes 99 and 100. The tooth mass, mainly plastic, does not fill the recesses 99, 100 but is set back at these points from the boundary surface 101 of the ring members 98 facing the tooth by such an amount that the ring edges 102 form effective cutting edges for the foodstuffs to be chewed. What has been shown for ring ledges 98 applies also to individual ring members if the same are used one for each tooth. The ring ledges are provided only for the cheek teeth. The arcade-shaped underside of the ring members 98 imparts to the underlying teeth the appearance of humped teeth so that cosmetic requirements are complied with.

The molar blocks 97, which consist mainly of plastic, and the ring ledges 98 of metal serving as chewing rails are prefabricated so that they can readily be combined to form individual units to meet all existing anatomical conditions.

The feeler and compensating system shown in FIGS. 12 and 13 and serving to find the spherical segment having the correct radius of curvature can be simplified and may consist of a liquid-filled, yielding and resilient hose directly in the finished denture between the tooth body 97 and the denture baseplate 104 (FIG. 16).

FIGS. 24 and 25 show a finished denture illustrating a device which complies more closely to the embodiment shown in FIGS. 12 and 13. In making this denture the method suggested by the invention has been adopted.

The drawing shows the denture baseplate 104, the molar block 97 and the ring ledge 98 forming a chewing rail. Whereas in previous constructions the denture baseplate and artificial teeth were directly connected to each other this is no longer the case according to the invention. The denture baseplate 104, which consists, e.g., of a metal grid, has small cylinders 105 arranged on two opposite points. The cavities of these cylinders communicate through a short conduit 106. This conduit extends on the inner boundary surface of the denture baseplate 104 so that it is not visible from the outside. The cavities of the cylinders 105 further contain small pistons 107, which are sealed in known manner against the sliding surface of the cylinder. At their outer end facing the block of teeth 97 the pistons 107 have hemispherical heads 108. These heads bear on the end face 109 of a sac-like recess 110 formed in the tooth 111 in registry with the cylinder 105 and the piston 107, 108. The conduit 106 and the cavities in the cylinders 105 connected thereto are filled with a suitable liquid such as oil, glycerine, liquid plastics or the like. The distance 113 between the upper boundary edge 112 of the block of teeth 97 or of the tooth 111 and the denture baseplate 104 is individually determined. In this way the block of teeth 97 can be hydraulically adjusted relative to the denture baseplate and any inaccuracies still existing will be compensated during the chewing operation.

Prefabricated teeth may be used instead of the block of teeth and the ring ledge in making the denture. The previously known prefabricated teeth, however, are not suitable for making non-gaping dentures. Non-gaping dentures cannot even be made for normal cases with the previously known humpless teeth which imitate worn natural teeth and are preferably formed with different chewing reliefs in an attempt to increase the chewing effect.

Humpless molar teeth for making non-gaping dentures must have a certain shape, which is characterized in that the chewing faces conform to the respective curvature of an individual spherical segment without Christensen's phenomenon and the angles between the tooth axes and those sections of the center lines of the chewing face which extend at right angles to the jaw ridge and toward the cavity of the mouth depend on the inclination of the interalveolar line and possibly on the biting position of the teeth.

Whereas in the previously known cheek teeth some consideration has only been given to the inclination of the interalveolar lines, the cheek teeth according to the invention take also the joint path angle into account.

The adaptation of the teeth to the individual spherical segment, the individual interalveolar line and the biting position of the teeth requires a large number of different forms of cheek teeth. In spite of the requirement that appropriate prefabricated teeth for non-gaping dentures and for all forms of jaws that may occur should be available, which teeth do not need regrinding in order to preserve the resistant outer layer, particularly in the case of porcelain teeth, it is not necessary according to the invention to increase the number and assortment of the matched individual teeth or sets compared to the previously usual stock so that increased stocks involving considerable expense and space are avoided. As will be explained in detail with reference to the drawing, a few individual types, which may be selectively combined to form sets, are sufficient and stocks can be substantially reduced compared to previous requirements.

The types required for equal joint path angles but different interalveolar lines and for different biting positions are apparent from the diagrammatic showings of FIGS. 27–31.

FIGS. 27 to 31 show illustrative embodiments of non-gaping dentures with differently formed cheek teeth in diagrammatic views whereas FIG. 32 is a perspective view of the formation and arrangement of teeth formed according to the invention in the example of a lower denture.

In FIGS. 27 to 31 the upper bite wall is indicated at 123, the palate portion at 124 and the lower bite wall at 125. The cheek teeth 126 connected to the upper bite wall and the teeth 127 affixed to the lower bite wall are of different shape in the various figures. The chewing faces 128 of the upper teeth 126 and the chewing surfaces 129 of the lower teeth 127 conform to the curvature 130 of the respective spherical segments the use of which precludes a gaping of the teeth. The interalveolar lines are indicated at 131 in the several figures.

It is apparent from FIGS. 27 to 29 that for equal curved lines 130, i.e., for equal joint paths, the tooth axes form different angles $\alpha_{1;2;3}$ . . . with those sections of the center lines of the chewing faces which extend at right angles to the jaw ridge toward the cavity of the mouth. These angles depend, on the one hand, on the inclination of the interalveolar line and on the other hand on the biting position of the teeth. In FIG. 27 the angle $\alpha_1$ equals 82° whereas $\alpha_2$ in FIG. 28 equals 93° and $\alpha_3$ in FIG. 29 equals 100°. FIGURES 30 and 31 show further the influence of the lines of curvature 130 where spherical segments having different radii are used. For instance, the angle $\alpha_4$ between the tooth axis and that section of the center line of the chewing face which extends at right angles to the jaw ridge toward the cavity of the mouth in the example of FIG. 30 is 75°, the biting position and interalveolar lines agreeing with those of FIG. 27. FIG. 31 shows that the greater inclination involves an angle $\alpha_5$ of 120° in spite of the fact that the arrangement of the teeth 126 and 127 differs from the aligned biting position.

In order to have the teeth available which will meet all possible inclinations of the interalveolar lines and the various lines of curvature corresponding to different joint path angles and which enable a predetermined biting position, a very large number of differently shaped individual teeth would be required. Because the individual spherical segments have generally radii of 12 cm., 18 cm. or 52 cm., the teeth must be arranged and formed only in consideration of these three spherical segments.

Numerous measurements have shown that the interalveolar lines have an inclination between 5 and 25° with the exception of rare extreme cases. It has also been found that where other conditions, i.e., the radii of curvature of the appertaining spherical segments, are equal, an inclination of the interalveolar lines of ±5° can be compensated by a slight tilting of the individual teeth. The resulting arrangement of teeth, which differs from the aligned biting position, is entirely tolerable from cosmetic considerations and obviously occurs also frequently with natural teeth.

Taking the above-mentioned spherical segment radii of 52 cm., 18 cm. and 12 cm. and the tolerance of ±5° of the inclination of the interalveolar lines into consideration, the following combinations result for the angular relations of the molars 111:

| Inclination of interalveolar line | | | 5° | 15° | 25° |
|---|---|---|---|---|---|
| Radius of spherical segment R=52 cm | $\alpha$ | Upper jaw | 88° | 78° | 68° |
| | | Lower jaw | 92° | 102° | 112° |
| Radius of spherical segment R=18 cm | $\alpha$ | Upper jaw | 94° | 84° | 74° |
| | | Lower jaw | 86° | 96° | 106° |
| Radius of spherical segment R=12 cm | $\alpha$ | Upper jaw | 98° | 88° | 78° |
| | | Lower jaw | 82° | 92° | 102° |

The number of types of molars resulting from this tabulation can be substantially reduced according to the invention by giving the teeth anatomic features which are similar in corresponding teeth of the lower and upper dentures. More particularly, the outside surfaces of the teeth may be similar in appearance so that the individual teeth may be used in the lower and upper dentures. By this measure the number of types of teeth required is reduced to nine compared to the eighteen types shown in the above tabulation.

When the inside and outside surfaces of corresponding teeth are similar, preferably symmetrical, the several teeth may be used in two positions rotated by 180° about the tooth axis so that dentures according to the invention require only four to five types as a result of the versatile use of the individual teeth. The several types are suitably graded in such a manner that a difference of ±4° in the inclination of the interalveolar lines can be compensated by a tooth arrangement differing from an aligned biting position. This results in four types for the molars, in which the tooth axes form angles of 90°, 98°, 106° or 114° with those sections of the center lines of the chewing faces which extend at right angles to the jaw ridge toward the cavity of the mouth.

Even fewer individual types are required for the second premolars because the interalveolar line does not differ greatly from 0° adjacent to the premolars. Where tooth types are used whereby differences of inclination of the interalveolar lines totalling 6°, i.e. ±3°, can be compensated, four types are obtained having angles α which amount preferably to 84°, 90°, 96° or 102°.

Finally, only two individual types are required for the first premolars, the angle α of which amounts to 85° and 95°. Because the interalveolar lines differ hardly adjacent to the premolars, the two types mentioned can be used for all practically occurring dentures.

The inside of the first premolars is preferably shaped to imitate an inside hump without giving consideration to the articulation of the spherical segment and the contact with the chewing face of the opposite tooth. This shape is particularly suitable for cosmetic reasons.

According to the invention ten to twelve individual types of humpless cheek teeth are sufficient for all practically occurring forms of jaws for use in non-gaping dentures without requiring to be ground.

The practical form of the several types of teeth is apparent from FIG. 32. In FIG. 32, 132 are the second molars, 133 the first ones. Toward the incisors the second premolars 134 follow as well as the first premolars 135. The figure shows that the individual cheek teeth bearing the same reference numbers are similarly shaped and have the same inside and outside surfaces so that teeth having the same reference numbers can be interchanged and may also be used in the appertaining upper denture. In the embodiment of FIG. 32 the first premolars are shown without an inside hump being imitated on the inside as is suitable for cosmetic reasons. The chewing faces of the teeth have fissures 136 so that the teeth have the appearance of normal humped teeth.

Different from the embodiment of FIG. 32 further features, particularly anatomic details, may be imitated provided that they are consistent with the spherical segment articulation.

What is claimed is:

1. A method of making non-gaping dentures, including the taking of impressions of the upper and lower jaws, said method comprising the steps of shaping bite walls in accordance with the impression, covering said bite walls with horseshoe-shaped metal templates, the surfaces of which form surfaces curved in two directions and having radii of curvatures which correspond to mean values, determining the symphysis path (Gothic arc) by means of said templates, fixing the templates in relation to each other according to the required height of bite and in the rear position of the lower jaw, transferring the bite walls and templates into an articulator, adjusting the height of bite in the articulator and positioning said bite walls and templates in accordance with the three-dimensional position relative to the mandibular joint by means of an orienting spherical segment, the radius of curvature of which agrees with that of the metal templates, replacing one of said jaw templates by a replaceable measuring spherical segment having a preselected radius of curvature, replacing the other template by a measuring instrument, introducing the bite walls of the upper and lower jaws together with said measuring instrument affixed to one of said bite walls and said measuring spherical segment affixed to the other of said bite walls into the mouth, measuring the distances between said measuring instrument and the opposed surface of the measuring spherical segment at least at three points, for instance, at the incisor and two molar points, in different positions of the lower jaw relative to the upper jaw, which positions are caused by forward and rearward and lateral movements of the lower jaw, replacing the measuring spherical segment by measuring spherical segments having different radii of curvatures until equal distances occur, and forming the occlusion surfaces of said bite walls according to said spherical segment at which equal distances occur.

2. A method as set forth in claim 1, said determination of the symphysis path being effected by intraoral recording without interference with the tongue.

3. A method as defined in claim 1 in which said measuring spherical segments are taken from a set of spherical segments having radii of curvature differing by predetermined dimensions from each other.

4. A method as defined in claim 1 in which said measuring spherical segments are taken from a set of spherical segments having respectively radii of curvature of 106 mm., 120 mm., 140 mm., 180 mm., 245 mm., 430 mm. and 2,100 mm.

5. A non-gaping denture comprising, in combination, a denture base plate; cheek teeth carried by said base plate and comprising preformed molar blocks, said molar blocks being movably arranged relative to said base plate in a direction approximately at right angles to the chewing face of said teeth and within predetermined limits; and a hydraulic compensating and transmitting means disposed between said molar blocks and said base plate.

6. An arrangement as defined in claim 5 in which said cheek teeth include metal ring members arranged on the chewing faces of said cheek teeth and having edges protruding from said faces and adapted to perform a cutting and shearing action.

7. An arrangement as defined in claim 5 in which said compensating and transmitting means include a liquid filled tube made of resiliently yielding material.

8. An arrangement as defined in claim 5 in which said compensating and transmitting means comprises at least two cylinders having working spaces, tube means interconnecting said working spaces and adapted to contain a fluid, and a piston mounted in each of said cylinders, said cylinders and pistons being disposed between said molar blocks and said base plate with said cylinders engaging one of said last-mentioned two elements and said pistons engaging the other of said elements.

9. A method of making non-gaping dentures comprising the steps of taking impressions of the upper and lower jaws; forming bite walls in accordance with the impressions; covering one of said bite walls with a spherical segment of preselected radius of curvature; covering the other of said bite walls with a template having at least two hydraulic feelers hydraulically connected to each other, protruding from said template and engaging said segment; placing said bite walls with said segment and said template respectively attached thereto into the mouth of the patient and observing the distance of said segment from said template during movement of the lower jaw at at least three points by checking the movement of said hydraulic-feelers and the distance between said segment and template at a third point between said hydraulic-feelers during such jaw movement; replacing said spherical segment of preselected radius against spherical segments of different radii until the distance between the last used spherical segment and said template remains unchanged during movement of the lower jaw; and forming the occlusion surface according to a spherical surface having a radius of curvature equal to the radius of curvature of said last used segment.

10. A method of making non-gaping dentures comprising the steps of taking impressions of the upper and lower jaws; forming bite walls in accordance with the impressions; covering one of said bite walls with a spherical segment of preselected radius of curvature; covering the other of said bite walls with a template having at least two hydraulic feelers hydraulically connected to each other, protruding from said template and engaging said segment; placing said bite walls with said segment and said template respectively attached thereto into the mouth of the patient and observing the distance of said segment from said template during movement of the lower jaw at at least three points by checking the movement of said hydraulic feelers and the distance between said segment and template at a third point between said hydraulic feelers during such jaw movement; and forming the occlusion surface according to a spherical surface having a radius of curvature equal to said preselected radius when the distance between said spherical segment and template remains unchanged during the movement of the lower jaw.

11. A method of making non-gaping dentures comprising the steps of taking impressions of the upper and lower jaws; forming bite walls in accordance with the impressions; covering one of said bite walls with a spherical segment of preselected radius of curvature; covering the other of said bite walls with a template having at least two hydraulic feelers hydraulically connected to each other, protruding from said template and engaging said segment; placing said bite walls with said segment and said template respectively attached thereto into the mouth of the patient and observing the distance of said segment from said template during movement of the lower jaw at at least three points by checking the movement of said hydraulic feelers and the distance between said segment and template at a third point between said hydraulic feelers during such jaw movement; and forming the occlusion surface according to a spherical surface having a radius of curvature greater than said preselected radius when an increase of the distance between segment and template occurs during forward movement of the lower jaw.

12. A method of making non-gaping dentures comprising the steps of taking impressions of the upper and lower jaws; forming bite walls in accordance with the impressions; covering one of said bite walls with a spherical segment of preselected radius of curvature; covering the other of said bite walls with a template having at least two hydraulic feelers hydraulically connected to each other, protruding from said template and engaging said segment; placing said bite walls with said segment and said template respectively attached thereto into the mouth of the patient and observing the distance of said segment from said template during movement of the lower jaw at at least three points by checking the movement of said hydraulic feelers and the distance between said segment and template at a third point between said hydraulic feelers during such jaw movement; and forming the occlusion surface according to a spherical surface having a radius of curvature smaller than said preselected radius when an increase of the distance occurs during rearward movement of the lower jaw.

References Cited in the file of this patent

UNITED STATES PATENTS

| | | |
|---|---|---|
| 1,216,596 | Nishi | Feb. 20, 1917 |
| 1,227,622 | Hope | May 29, 1917 |
| 2,141,487 | Pleasure | Dec. 27, 1938 |
| 2,303,874 | Brown | Dec. 1, 1942 |
| 2,417,965 | Beresin | Mar. 25, 1947 |
| 2,612,688 | Avary | Oct. 7, 1952 |
| 2,618,853 | Singer et al. | Nov. 25, 1952 |
| 2,641,838 | Beresin | June 16, 1953 |
| 2,685,133 | Greene et al. | Aug. 3, 1954 |
| 2,746,148 | Jermyn | May 22, 1956 |
| 2,748,481 | Glueck | June 5, 1956 |
| 2,776,485 | Stuart | Jan. 8, 1957 |
| 2,801,470 | Logan et al. | Aug. 6, 1957 |
| 2,941,295 | Jermyn | June 21, 1960 |